(12) United States Patent
Toyoshima et al.

(10) Patent No.: US 9,386,789 B2
(45) Date of Patent: Jul. 12, 2016

(54) BREWED SOY SAUCE AND METHOD OF PRODUCING THE BREWED SOY SAUCE

(71) Applicant: Yamasa Corporation, Choshi, Chiba (JP)

(72) Inventors: Yoshiyuki Toyoshima, Choshi (JP); Yoshinobu Mogi, Choshi (JP); Kaori Miura, Choshi (JP)

(73) Assignee: YAMASA CORPORATION, Choshi (JP)

( * ) Notice: Subject to any disclaimer, the term of this patent is extended or adjusted under 35 U.S.C. 154(b) by 0 days.

(21) Appl. No.: 14/292,756

(22) Filed: May 30, 2014

(65) Prior Publication Data

US 2014/0356481 A1     Dec. 4, 2014

Related U.S. Application Data

(60) Provisional application No. 61/829,501, filed on May 31, 2013, provisional application No. 61/901,877, filed on Nov. 8, 2013.

(51) Int. Cl.
*A23L 1/238*     (2006.01)
*A23L 1/20*      (2006.01)

(52) U.S. Cl.
CPC ............... *A23L 1/238* (2013.01); *A23L 1/2008* (2013.01); *A23V 2002/00* (2013.01)

(58) Field of Classification Search
CPC ......................................... A23L 1/238
USPC ............................. 426/31, 589, 52
See application file for complete search history.

(56) References Cited

U.S. PATENT DOCUMENTS

| | | | |
|---|---|---|---|
| 3,932,671 A * | 1/1976 | Yokotsuka et al. | 435/68.1 |
| 4,587,127 A | 5/1986 | Akao et al. | |
| 8,173,185 B2 | 5/2012 | Hanada et al. | |
| 2003/0129277 A1 * | 7/2003 | Kasuga et al. | 426/46 |
| 2005/0170046 A1 | 8/2005 | Orimo et al. | |

FOREIGN PATENT DOCUMENTS

| | | |
|---|---|---|
| JP | 7-20426 B2 | 3/1995 |
| JP | 10-66539 A | 3/1998 |
| JP | 10-99043 A | 4/1998 |
| JP | 2004024248 A | 1/2004 |
| JP | 4716369 B2 | 4/2011 |
| WO | 2011-303779 A1 | 3/2011 |

OTHER PUBLICATIONS

WIPO, European International Search Authority, International Search Report and Written Opinion mailed Oct. 2, 2014 in International Patent Application No. PCT/JP2014/002894, 9 pages.

* cited by examiner

*Primary Examiner* — Hamid R Badr
(74) *Attorney, Agent, or Firm* — Masuvalley & Partners

(57) ABSTRACT

The present invention provides a brewed soy sauce that has light color and reduced smell with a robust taste. In the brewed soy sauce, HEMF is less than 15 ppm. Glutamic acid is 0.9% (w/v) or more. Lactic acid and acetic acid are respectively 0.1% (w/v) or more. Reducing sugar is 1.5% (w/v) or less. Levulinic acid is less than 0.01% (w/v). And, pH is 4.5-5.5. The brewed soy sauce is produced as follows: First, a raw material is prepared from a plant protein-source material and a low-starch carbohydrate-source material. Then, koji is made by inoculating koji mold to the prepared raw material. Next, salt water is added to the koji, and the mixture of the salt water and koji is fermented. At least 5 days after initiating the fermentation, yeast belonging to *Candida* genus is added to the mixture. Then, the fermentation is matured.

12 Claims, 4 Drawing Sheets

BREWED SOY SAUCE AND METHOD OF PRODUCING THE BREWED SOY SAUCE

This application claims the benefit of U.S. Provisional Application Ser. No. 61/829,501, filed on May 31, 2013, and U.S. Provisional Application Ser. No. 61/901,877, filed on Nov. 8, 2013, which are hereby expressly incorporated by reference in their entirety for all purposes.

TECHNICAL FIELD

The present invention relates to brewed soy sauce and a method of producing the brewed soy sauce.

BACKGROUND OF THE INVENTION

In recent years, soy sauce has been used as a seasoning in larger variety of processed foods. It seems that the traditional regular brewed soy sauce cannot satisfy some of the diverse consumer demands. There is particularly a strong demand for light-colored and reduced-smelling seasoning that does not harm the color and flavor of the processed foods but that can still add the savory taste of soy sauce to the processed foods. Furthermore, although consumer demands are various, their basic request is that the seasoning should be produced by brewing the raw material with microorganisms, not produced chemically or enzymatically like hydrolyzed vegetable protein (HVP).

Japanese examined patent publication (koukoku) H7-20426 (1995-20426) discloses a method of producing soy sauce in which warmed salt water is added to a mixture of defatted soybean and koji mold. Then, the moromi is maintained at 37-43° C. and its salt concentration is adjusted to be 8-12%. Furthermore, the fermentation is maintained for 5-20 days after adding the yeast. Thereby, soy sauce that has lighter color and milder smell is obtained. However, this method needs to maintain the moromi at 37-43° C. Thus, the energy cost for brewing is higher than the regular soy sauce brewing. This results in high manufacturing costs. In addition, this method brews the moromi in salt water which has low salt concentration. Thus, there is a risk that putrefactive bacteria grow. To suppress the growth of putrefactive bacteria, the moromi is maintained at high temperature. However, this also suppresses the fermentation by lactic acid bacteria. Thus, soy sauce obtained by this method has low content of lactic acid, which contributes to the profound taste of soy sauce. Also, the low lactic acid concentration is considered to lower the mold prevention ability of the soy sauce.

In Japanese Patent 4716369, about 150% of water is added to the moromi. Then, the moromi is cultured after adding $Zygosaccharomyces$ yeast. However, even in this method, because the yeast growth is facilitated by the dilution of moromi, the color of the soy sauce becomes dark, and the smell caused by the yeast also increases.

Japanese Patent Application Publication H10-66539 (1998-66539) and Japanese Patent Application Publication H10-99043 (1998-99043) disclose a method of producing a seasoning by hydrolyzing a mixture of fermented koji protein and yeast at 2-25° C., at pH 4.5-10 and for 6 hours-28 days. These documents suggest that brewing moromi is unnecessary because cohydrolysis occurs, resulting in a lower concentration of reducing sugars. However, this method is concerned to result in the low amount of lactic acid, which is generated by lactic acid fermentation, as well as other flavorful constituents generated by the maturation of fermentation. Therefore, the flavor of the seasoning obtained by these methods is considered to be different from the flavor of soy sauce.

Furthermore, the acid hydrolysis solution obtained by acid-hydrolyzing protein sources such as soybean or wheat gluten lacks aromatic components and constituents that are generated by fermentation. In addition, levulinic acid and formic acid are generated during the acid hydrolysis. Therefore, the composition and taste of this seasoning is very different from those of brewed soy sauce.

International publication WO2011/030779 reports the method of producing a seasoning powder. In this method, protein material is hydrolyzed with cultured liquid koji. Then, the hydrolysate is spray-dried without removing the solid components generated by hydrolysis. However, this seasoning is a hydrolyzed vegetable protein (HVP) and totally different from soy sauce.

SUMMARY OF THE INVENTION

The purpose of the present invention is to provide brewed soy sauce that has light color and reduced smell, but has thick taste.

The inventors conducted extensive research to achieve this objective. They discovered that the taste, color and flavor of brewed soy sauce become optimal if 4-hydroxy-2-ethyl-5-methyl-3(2H)-furanone (HEMF) is less than 15 ppm, glutamic acid is 0.9% (w/v) or more, lactic acid and acetic acid are 0.1% (w/v) or more respectively, reducing sugar is 1.5% (w/v) or less, levulinic acid is less than 0.01% (w/v), and pH is 4.5-5.5.

Furthermore, the inventors pursued the method for producing the soy sauce having such properties. As a result, they discovered that it is possible to produce the soy sauce, which has light color and mild flavor as well as reduced heat-browning property, in a short period of time by preparing raw materials using a plant protein-source material and a low-starch carbohydrate-source material for making koji, and by brewing the koji with adding yeast belonging to $Candida$ genus at least 5 days after starting brewing and preferably within 30 days after the initiation of brewing.

The soy sauce of the present invention has lighter color and reduced smell. Yet, the taste of the soy sauce of the present invention is comparable to the regular soy sauce. In addition, the color of the soy sauce of the present invention does not become dark significantly even when it is heated. Therefore, when the soy sauce of the present invention is used for processed foods, the soy sauce can steadily add its taste to the processed food without harming the luster, color and flavor of the processed food.

Furthermore, the inventors discovered that when the soy sauce of the present invention was processed into powder form, the obtained soy sauce powder became resistant to solidification and deliquescence. Accordingly, the soy sauce of the present invention is suitable to provide the consumers not only in the regular liquid form but also in the powder form.

DETAILED DESCRIPTION OF THE INVENTION

1. Soy Sauce

Figure 1:
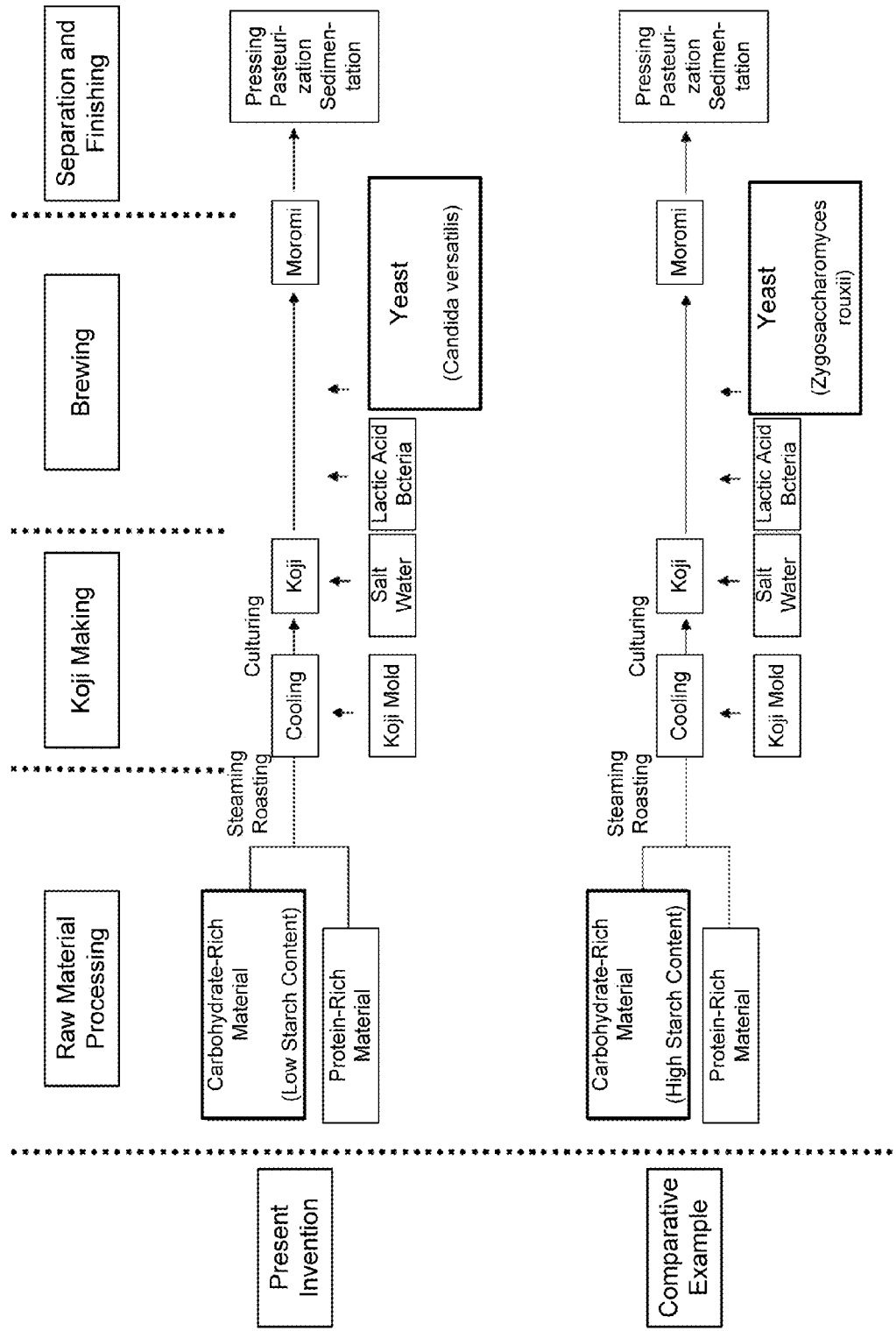
FIG. 1 is the process charts that compare and outlines differences between the soy sauce production method of the present invention and the traditional process (comparative example).

The inventors pursued brewed soy sauce that has light color and reduced smell but has the taste comparable to the regular soy sauce, which is also called koikuchi shoyu. As a result, the inventors discovered that the brewed soy sauce having the following features (a)-(g) had such properties:
  (a) 4-hydroxy-2-ethyl-5-methyl-3(2H)-furanone (HEMF) is less than 15 ppm,
  (b) reducing sugar is 1.5% (w/v) or less,
  (c) glutamic acid is 0.9% (w/v) or more,
  (d) lactic acid is 0.1% (w/v) or more,
  (e) acetic acid is 0.1% (w/v) or more,
  (f) levulinic acid is less than 0.01% (w/v), and
  (g) pH is 4.5-5.5.

Surprisingly, the inventors further discovered that, when the soy sauce having such features is powderized, the obtained soy sauce powder became more resistant to solidification and deliquescence.

In the soy sauce of the present invention, concentration of HEMF is less than 15 ppm, even if it is detected. Concentration of HEMF is preferably less than 10 ppm, and more preferably less than 5 ppm. By reducing the HEMF concentration, the characteristic soy sauce smell is reduced.

Other than the HEMF, isobutanol, n-butanol and isoamyl alcohol may also contribute to the characteristic smell of the soy sauce. The total concentration of these isobutanol, n-butanol and isoamyl alcohol is preferably less than 5 ppm, and more preferably less than 2 ppm. Thereby, the characteristic soy sauce smell is further reduced. On the other hand, the concentration of 4-ethylguaiacol, a constituent of other kind of aroma, is preferably about 1-5 ppm.

The concentration of reducing sugar is 1.5% (w/v) or less. The concentration of reducing sugar is preferably 0-1.0% (w/v). As described above, when the soy sauce of the present invention is powdered, the obtained soy sauce powder solidifies and deliquesces less easily. The inventors consider that the lower reducing sugar content in the soy sauce of the present invention may cause this effect. The reducing sugar is a sugar having a free aldehyde or ketone group in the sugar molecule and having a reductive property. Examples of the reducing sugar are monosaccharides such as glucose, galactose, fructose and glyceraldehyde, and maltose-type disaccharides and oligosaccharides such as lactose, arabinose and maltose.

It is preferable that the total concentration of both glucose and galactose, which are the major reducing sugar in the soy sauce, is 1.0% (w/v) or less, more preferably 0.5% (w/v) or less. Furthermore, the galactose concentration is preferably 0.5% (w/v) or less. Besides, the glucose concentration is preferably 0.5% (w/v) or less, and more preferably 0.1% (w/v) or less. The inventors consider that the reason of less easier solidification and deliquescence of the soy sauce powder generated from the soy sauce of the present invention is because the concentrations of glucose and galactose are particularly low.

In the soy sauce of the present invention, concentration of glutamic acid is 0.9% (w/v) or more. The concentration of glutamic acid is preferably 0.9-4.0% (w/v). Furthermore, in the soy sauce of the present invention, concentration of lactic acid is 0.1% (w/v) or more. The concentration of lactic acid is preferably 0.1-2.0% (w/v). Similarly, in the soy sauce of the present invention, concentration of acetic acid is 0.1% (w/v) or more. The concentration of acetic acid is preferably 0.1-1.0% (w/v). These molecules are the major constituents that contribute to the taste of the soy sauce. Since the soy sauce of the present invention preferably contains these constituents with the concentrations described above, it has a taste comparable to that of the regular soy sauce. Furthermore, in the soy sauce of the present invention, concentration of levulinic acid is less than 0.01% (w/v). The concentration of levulinic acid is preferably below the detectable limit. It is known that levulinic acid is absent in the brewed soy sauce although it is abundant in the plant protein hydrolyzates. Because the soy sauce of the present invention has low concentration of levulinic acid but sufficient concentrations of other constituents characteristic in the brewed soy sauce, the soy sauce of the present invention has profound taste that the brewed soy sauce has.

pH of the soy sauce of the present invention is 4.5-5.5.

In the soy sauce of the present invention, amination ratio (AN/TN) is preferably 40-60%. If the amination ratio is within this range, the taste of the soy sauce becomes further closer to the taste of regular soy sauce. Amination ratio is the percentage (%) of amino acid nitrogen (AN) to total nitrogen (TN).

Light transmittance at 660 nm in the soy sauce of the present invention is preferably at least 55%, and more preferably at least 65%. Furthermore, standard color of the soy sauce determined by JAS (Japan Agricultural Standards) of the present invention is preferably at least #22. Such soy sauce is less likely to harm the luster and color of the processed foods.

Moreover, when the soy sauce of the present invention is heated at 100° C. for 120 minutes, the reduction of the light transmittance at 660 nm is preferably 30% or less, and more preferably 20% or less. When such soy sauce is used in the processed foods, it is less easily to harm the color and luster of the processed food even when the processed food is heated.

As described above, the inventors discovered that, when the soy sauce of the present invention is powderized, the obtained soy sauce powder become resistant to the solidification and deliquescence. In addition, the soy sauce powder obtained by powderizing the soy sauce of the present invention has higher nitrogen yield. More specifically, when the soy sauce of the present invention is processed into powder form by spray drying, without adding additives such as excipient, the nitrogen yield of the formed soy sauce powder is preferably at least 70%. Such soy sauce powder provides higher reproducibility of taste when used in foods.

When the soy sauce of the present invention is powderized, the obtained soy sauce powder preferably has at least 80% of sieving rate through a 0.6 mm-mesh sieve. Such soy sauce powder has excellent miscibility with other seasonings or ingredients, and easily dissolves in water.

2. Production of Soy Sauce

The inventors also discovered the suitable method of producing the soy sauce described above. Below, the method is described.

FIG. 1 is the process chart showing the method of producing the soy sauce of the present invention. As shown in this figure, this method is composed of following four major steps.

(1) Raw material processing step: The raw materials are processed in the suitable form for producing the soy sauce.
(2) Koji-making step: Koji mold is inoculated on the processed raw materials. Then, the mixture of the raw materials and koji mold is cultured to produce koji.
(3) Brewing step: Salt water is added to the koji produced. Then, the mixture of koji and salt water is fermented.
(4) Separation and finishing step: The liquid component of moromi, which is obtained by the fermentation, is separated. Then, the obtained raw soy sauce is processed to form the product.

One big feature of the present invention is to use a plant protein-source material and a low-starch carbohydrate-source material as raw materials in the raw material processing step. Another big feature of the present invention is to add yeast belonging to *Candida* genus to moromi in the brewing step at least 5 days after putting the koji in the salt water, and continue the fermentation. Each step is explained in detail below.

(1) Raw Material Processing Step

In this process, the raw materials are prepared first. The raw materials used in this step are the plant protein-source material and low-starch carbohydrate-source material. The plant protein-source material is a raw material that is derived from plant and that has relatively high protein content. Examples of the plant protein-source material are pulses such as soybean, tubers and roots such as potato, and glutens such as corn gluten, rice gluten and wheat gluten. When soybean is used as the plant protein-source material, the soybean can be in the form of defatted soybean or whole soybean. The plant protein-source material is moisturized and heated, for example by soaking in water and steaming following the standard procedure of soy sauce production.

One indicator of the low-starch carbohydrate-source material is that the starch content in the material is 30% (w/w) or less, preferably 20% (w/w) or less. Examples of the low-starch carbohydrate-source material are wheat varieties such as wheat and barley, poaceous cereals such as millet and foxtail millet, and pseudocereals such as buckwheat and quinoa. Among these, a part of the grain, particularly epidermal portion (germ portion) of the grain is preferable as the low-starch carbohydrate-source material. Of these, wheat bran is the most suitable as the low-starch carbohydrate raw material. The inventors discovered that the color of the obtained soy sauce becomes lighter even though the taste is still comparable to the regular soy sauce when the soy sauce is made from such raw materials. The low-starch carbohydrate-source material is preferably heated, for example, by roasting following the standard procedure of soy sauce production.

The plant protein-source material and the low-starch carbohydrate-source material processed as described above are mixed. The ratio of the mixture is preferably 0.01-1 kg of the low-starch carbohydrate raw material per 1 kg of the plant protein-source material.

(2) Koji Making Step

Koji mold is inoculated to the mixture of the plant protein-source material and the low-starch carbohydrate-source material prepared in the previous step. Then, the koji is produced, following the standard procedure of soy sauce production. The material in which the koji mold is grown is called koji.

(3) Brewing Step

The obtained koji is brewed in a tank containing salt water. The NaCl concentration of the salt water is preferably 23-25% (w/v). The mixing ratio of koji and salt water is preferably 1-3 liters of the salt water per 1 kg of koji. After providing the koji in the salt water, the mixture is fermented by maintaining the mixture at 15-35° C. for at least 30 days with intermittent stirring. Thereby, the mixture is brewed. The fermented mixture of koji and salt water is called moromi.

At the initiation of brewing, within 1 day after the initiation, at the time of inoculating the koji mold, or during culturing the koji mold in the previous step, lactic acid bacteria (including niacin-producing lactobacilli) may be added to the mixture. The amount added may be $10^5$-$10^8$ cfu/g (colony forming unit).

In the present invention, yeast belonging to the *Candida* genus is added to the mixture of koji and salt water, or moromi at least 5 days after the start of brewing, in other words, after mixing the koji and salt water. Of the yeast belonging to the *Candida* genus, *Candida versatilis* (*C. versatilis*) is the best. It is preferable to add the yeast to the mixture within 30 days after the initiation of brewing. The inventors discovered that the taste of the soy sauce becomes comparable to the regular soy sauce but the color becomes light if the yeast belonging to the *Candida* genus is added to the moromi within such a period. The amount of the yeast added is preferably $10^5$-$10^7$ cfu per 1 g of moromi.

After addition of the yeast, it is preferable to continue the fermentation for at least 30 more days to mature the moromi. Furthermore, this maturation period is preferably within 90 days. The inventors discovered that the soy sauce having the above properties is optimally obtained by maturing the moromi for such a period of time.

(4) Separation and Finishing Step

After completion of brewing, the moromi is separated into liquid component and solid component for example by pressing the moromi in the same way as regular soy sauce production. This separated liquid component is called raw soy sauce. Thereafter, the soy sauce of the present invention, is obtained by performing settlement (sediment removal) and pasteurization (heat treatment) following the standard procedure of soy sauce production. As explained above, the soy sauce obtained by the above described method has a taste that is comparable to the regular soy sauce while the color of the soy sauce is light and its smell is reduced.

If necessary, the obtained soy sauce may be made into a powder form. The powderization may be performed by standard methods such as spray drying, vacuum drying or freeze drying. As described above, when the soy sauce of the present invention is powderized, solidification and deliquescence occur less easily. During the powderizing process, an anti-solidification agent such as dextrin and an excipient such as lactose and starch may be added to the soy sauce. Standard procedure may be employed to add such agents.

EXAMPLES

Below, the present invention is further explained in detail based on specific examples. However, the present invention is not limited by these examples.

Example 1

Production of the Soy Sauce of the Present Invention

First, water was added to 5 kg of defatted soybean so that the weight of the water added was 80% of the weight of the defatted soybean. Then, the defatted soybean was steamed under the pressure of 2 kg/cm$^2$ for 9 minutes. The steamed defatted soybean was then cooled to be 40° C. Then, the cooled defatted soybean was mixed with 0.6 kg of wheat bran (starch content 12% (W/V)). Thereby, raw material mixture was obtained. Koji mold was inoculated to this mixture. Then, the mixture was incubated in a small, aerated koji-making device at 28° C. of aeration temperature for 24 hours, followed by 26° C. for 20 hours. Thereby, soy sauce koji was obtained.

5.5 liters of 24.5% salt water was added to 3 kg of the obtained koji in a small container. Thereby, moromi was prepared. This moromi was fermented at 15° C. for 2 weeks. Subsequently, the temperature of moromi was gradually raised. 3 weeks after adding the salt water, C. versatilis was inoculated to the moromi so that the amount of the C. versatilis became 10$^6$ cfu per 1 g of moromi. Then, the fermentation was continued at 30° C. for 2 more months to mature the moromi.

Example 2

Effect of the Yeast

In this example, the soy sauce was brewed by the same method as the one described in the Example 1. However, either of the yeast belonging to *Zygosaccharomyces* genus or *Candida* genus was added in the moromi. Then, galactose concentration was measured on day 0, day 14 and day 30 after adding the yeast.

The results are shown in Table 1. It was found that the *Candida* yeast reduced the galactose concentration of the soy sauce more significantly. The sugar content was analyzed by high-performance liquid chromatography (HPLC; System; Shimadzu LC10 series, used column; TSK-gel SugarAXG, column temperature; 60° C.), following the standard procedure.

TABLE 1

| | Galactose Concentration % (w/v) | | |
|---|---|---|---|
| | Days after Adding Salt Water | | |
| | 0 | 14 | 30 |
| C. versatilis | 1.11 | 0.68 | 0.46 |
| Z. rouxii | 1.11 | 0.99 | 0.84 |

Z. rouxii: NBRC 0506
C. versatilis: JCM catalog No 8270

Example 3

Characteristics of the Produced Soy Sauce

Below are the analysis results of the soy sauce produced in the Example 1.

3-1: Chromaticity

Concentrations of the constituents of the soy sauce produced in the Example 1 were adjusted to be 1.57% (w/v) of total nitrogen, 16.6% (w/v) of sodium chloride and 2.2% (w/v) of ethanol. Then, the concentration-adjusted soy sauce was pasteurized and filtered. Then, the color of the obtained soy sauce was determined by measuring 660-nm transmittance of the soy sauce. The result is shown in Table 2. It was found that the color of the soy sauce of the present invention was much lighter than the regular soy sauce of the comparative example. The chromaticity of the soy sauce of the present invention was as low as that of light soy sauce, which is also called usukuchi shoyu.

TABLE 2

| | Transmittance (%) |
|---|---|
| Present Invention | 74.7 |
| Comparative Example | 26.1 |

3-2: Concentration of Reducing Sugars

Sugar concentrations of the soy sauce of the present invention and regular soy sauce of the comparative example were analyzed by HPLC. The result is shown in Table 3. The concentrations of reducing sugars of the soy sauce of the present invention were significantly lower than those of the regular soy sauce of the comparative example. It was found that glucose and galactose were particularly lower in the soy sauce of the present invention than in the regular soy sauce of the comparative example. The analysis was carried out with the following condition—System: Shimadzu LC10 series, used column: TSK-gel SugarAXG, and column temperature: 60° C.

TABLE 3

| | Galactose % (w/v) | Glucose % (w/v) | Total Concentration of Reducing Sugars % (w/v) |
|---|---|---|---|
| Present Invention | 0.42 | 0.00 | 0.83 |
| Comparative Example | 0.66 | 1.52 | 2.63 |

3-3: Summary of the Analysis

Concentrations of other constituents of the soy sauce of the present invention and the regular soy sauce of the comparative example were measured by standard methods. The result is summarized in Table 4, which also includes the concentrations of reducing sugars. The concentration of reducing sugars in the soy sauce of the present invention was lower and its color was lighter than the regular soy sauce of the comparative example. However, except for this, concentrations of other constituents including glutamic acid, lactic acid and acetic acid, which were generated by the fermentation, in the soy sauce of the present invention were almost the same as those of the regular soy sauce. In addition, pH and amination ratio of the soy sauce of the present invention were also equivalent to those of the regular soy sauce. Therefore, it was confirmed that the taste of the soy sauce of the present invention was satisfactory for the use of processed foods. It is known that lactic acid and acetic acid soften the bitter taste and salty taste of soy sauce and enhance the profound taste. Since the soy sauce of the present invention contained lactic acid and acetic acid comparable to the regular brewed soy sauce, it was concluded that the soy sauce of the present invention had a taste equivalent to that of the regular soy sauce even in this respect. In addition, the concentration of levulinic acid and amination ratio indicate that the soy sauce of the present invention is clearly different from hydrolyzed vegetable protein (HVP). Even in the respect of levulinic acid and amination ratio, it is concluded that the taste and savor of the soy sauce of the present invention are comparable to those of the regular soy sauce.

TABLE 4

| | Total Nitrogen % (w/v) | Glutamic Acid % (w/v) | Lactic Acid % (w/v) | Acetic Acid % (w/v) | Levulinic Acid % (w/v) | Reducing Sugars % (w/v) | Amination Rate % (w/w) | Transmittance (%) | pH |
|---|---|---|---|---|---|---|---|---|---|
| Present Invention | 1.57 | 1.18 | 1.27 | 0.20 | Not Detected | 0.83 | 45.6 | 74.7 | 4.96 |
| Comparative Example | 1.57 | 1.14 | 1.20 | 0.17 | Not Detected | 2.63 | 46.9 | 26.1 | 4.86 |

3-4: Aromatic Components

The aroma concentrates of the soy sauce were obtained by eluting with dichloromethane. Then, the concentrates were analyzed by gas chromatography (System: Varian 1200/1200L, GC/MS and Column: CP WAX 60 m×0.25 mm 0.25 µm, Column Temp: 40° C. (10 min)→10° C./min→250° C. (20 min), Carrier Gas: He 1.2 mL/min, Injection: 250° C. Splitless (1 min)).

Figure 2:
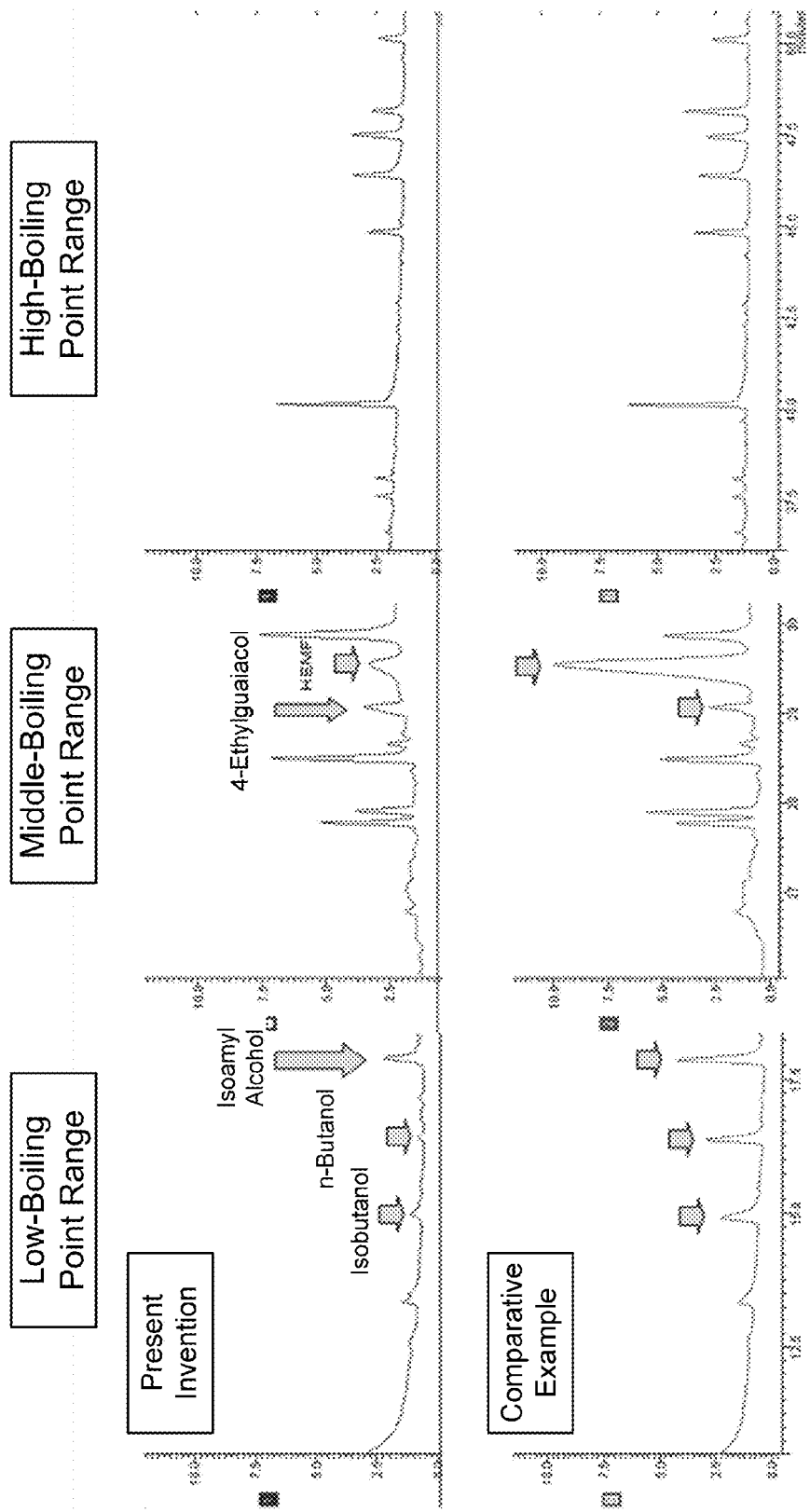
FIG. 2 is the gas chromatography charts that show the results of gas chromatography analysis of aromatic components of the soy sauce of the present invention and the traditional regular soy sauce. In the figure, the upper charts show the measurement results of the soy sauce of the present invention. The lower charts show the measurement results of the traditional regular soy sauce.

The results are shown in Table 5 and FIG. 2. It was found that the soy sauce of the present invention contained remarkably less HEMF, isobutanol, n-butanol and isoamyl alcohol, which were characteristic aromatic components of the soy sauce, than the regular soy sauce of the comparative example. It was also found that the smell of the soy sauce of the present invention was mild. On the other hand, concentrations of other aromatic components such as 4-ethylguaiacol in the soy sauce of the present invention were comparable to those of the regular soy sauce of the comparative example.

TABLE 5

| | Concentration (ppm) | |
|---|---|---|
| Component | Present Invention | Comparative Example |
| Isobutanol | Not Detected | 6.07 |
| n-Butanol | Not Detected | 4.13 |
| Isoamyl Alcohol | 1.24 | 6.94 |
| 4-Ethylguaiacol | 1.43 | 1.64 |
| HEMF | 3.30 | 37.97 |

3-5: Effects of Heat Treatment on Browning of Soy Sauce

Concentrations of the constituents of the soy sauce produced in the Example 1 were adjusted to be 1.57% (w/v) of total nitrogen, 16.6% (w/v) of sodium chloride and 2.2% (w/v) of ethanol. Then, the concentration-adjusted soy sauce was pasteurized and filtered. The obtained soy sauce was heated at 100° C. for 120 minutes. Then, change of light transmittance, OD 660 nm, was measured to observe the color change. The result is shown in Table 6. As shown in this table, the degree of browning of the soy sauce of the present invention was significantly lower than that of the regular soy sauce. Therefore, it was confirmed that the soy sauce of the present invention was ideal for the use of processed foods such as retort foods that were supposed to be heated.

TABLE 6

| Heating Time (min) | Comparative Example (transmittance %) | Present Invention (transmittance %) |
|---|---|---|
| 0 | 30.9 | 63.1 |
| 120 | 13.7 | 53.9 |
| Difference (Decrease Rate) | 17.2 (55.7%) | 9.2 (14.6%) |

Example 4

Characteristics of the Powderized Soy Sauce of the Present Invention

4-1: Powderizing Efficiency

The liquid soy sauce obtained in Example 1 was powderized. This powderization was performed, using a mini spray dryer manufactured by Nihon BUCHI K.K. (B-290). More specifically, 200 g of the soy sauce was powderized with the following machine setting: inlet temperature 200° C., aspirator output 100%, pump 30%, nozzle cleaner 3, and Q-flow 4. As a comparison, regular soy sauce was also powderized.

After powderizing, nitrogen yield of the produced soy sauce powder was measured and calculated. The result is shown in Table 7. As shown in this table, the nitrogen yield of the soy sauce of the present invention was more than 25% higher than that of the regular soy sauce. The nitrogen yield was calculated from (A) nitrogen amount in the 200 g of the soy sauce before powderizing and (B) nitrogen amount in the obtained soy sauce powder (nitrogen yield=B/A×100).

TABLE 7

| | Comparative Example | Present Invention |
|---|---|---|
| Nitrogen Yield (%) | 56.98 | 83.05 |

4-2: Moisture Absorption

Figure 3:
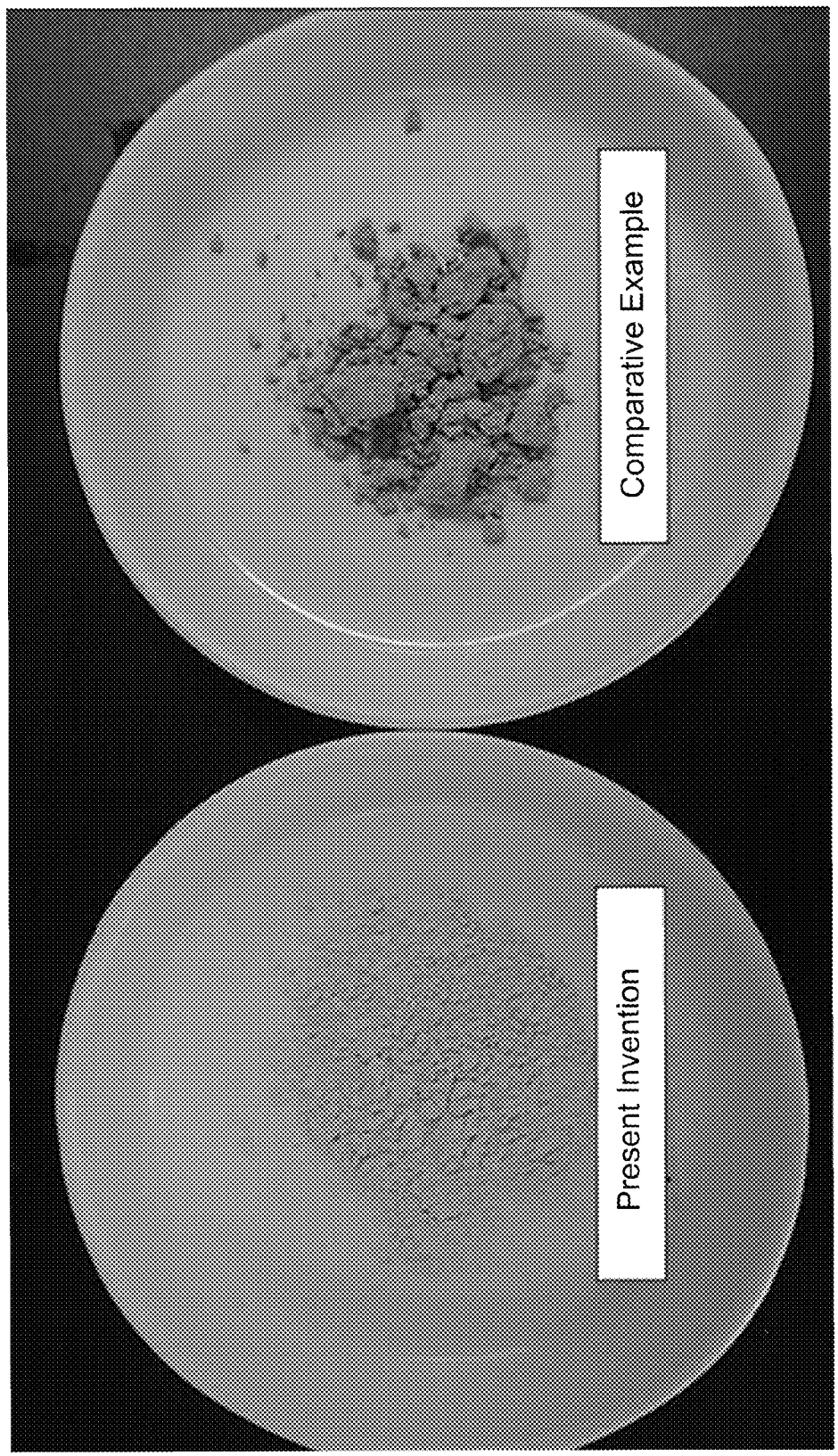
FIG. 3 is the picture of powdered soy sauce of the present invention and the traditional regular soy sauce that were placed in a desiccator at 27° C. and 60% humidity for 5 hours. The left dish contains the soy sauce powdered from the present invention. The right dish contains the soy sauce powdered from the traditional regular soy sauce.

The powdered samples were placed in a desiccator set at 27° C. and 60% humidity. 5 hours later, conditions of the powder samples were observed. The result is shown in FIG. 3. As shown in this figure, the soy sauce powder of the present invention was apparently smoother and its solidification was much less than that of the comparative example.

4-3: Degree of Solidification

Figure 4:
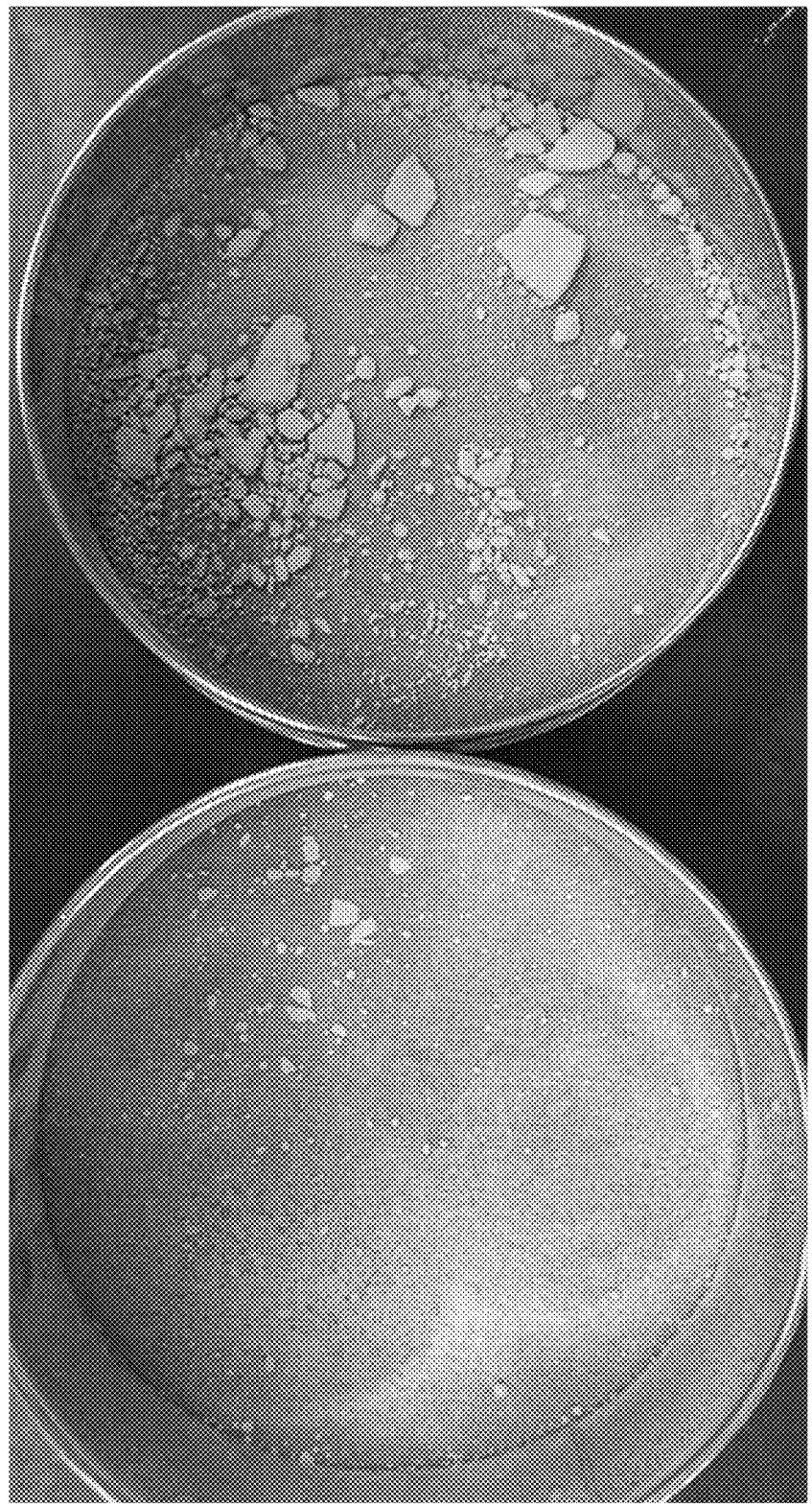
FIG. 4 is the picture of the sieves after soy sauce powder of the present invention and the traditional regular soy sauce were sieved through a 0.6 mm-meshed stainless mesh. The soy sauce of the present invention and the traditional regular soy sauce were processed into powder form. Then, the soy sauce powder was heated at 80° C. for 2 hours before sieving. The left sieve shows the remaining after sieving the powdered soy sauce of the present invention. The right sieve shows the remaining after sieving the powdered traditional regular soy sauce.

An excipient was respectively added to the liquid soy sauce obtained in the Example 1 and the regular soy sauce with 30% weight ratio of the excipient to the soy sauce. Then, the samples were powderized in the same way as described in '4-1: Powdering Efficiency'. The obtained powder samples were heated at 80° C. for 2 hours. Then, the heated samples were sieved through a stainless steel sieve having 0.6 mm-mesh. Weights of the samples before and after sieving were measured. The result is shown in Table 8 and FIG. 4. As shown in FIG. 4, the degree of the solidification of the soy sauce powder of the present invention was obviously less than that of the comparative example. As shown in Table 8, the soy sauce powder of the present invention had higher pass-through rate than the comparative example.

TABLE 8

|  | Before Sieving (g) | After Sieving (g) | Pass-Through Rate (%) |
| --- | --- | --- | --- |
| Present Invention | 17.14 | 16.03 | 94 |
| Comparative Example | 16.47 | 11.19 | 68 |

The invention claimed is:

1. A brewed soy sauce comprising:
   concentration of 4-hydroxy-2-ethyl-5-methyl-3(2H)-furanone is less than 15ppm;
   concentration of reducing sugar is 1.5% (w/v) or less;
   concentration of glutamic acid is 0.9% (w/v) or more;
   concentration of lactic acid is 0.1% (w/v) or more;
   concentration of acetic acid is 0.1% (w/v) or more;
   concentration of levulinic acid is less than 0.01% (w/v);
   pH is 4.5-5.5;
   concentration of 4-ethylguaiacol is 1-5 ppm; and,
   total concentration of isobutanol, n-butanol, and isoamyl alcohol is less than 5ppm;
   wherein said brewed soy sauce is produced using wheat bran as a carbohydrate-source material.

2. The brewed soy sauce of claim 1, wherein amination ratio is 40-60%.

3. The brewed soy sauce of claim 1, wherein total concentration of glucose and galactose is 1.0% (w/v) or less.

4. The brewed soy sauce of claim 3, wherein concentration of glucose is 0.5% (w/v) or less.

5. The brewed soy sauce of claim 4, wherein concentration of glucose is 0.1% (w/v) or less.

6. The brewed soy sauce of claim 1, wherein a light transmittance at 660nm wavelength is about 55% or more.

7. The brewed soy sauce of claim 6, wherein a rate of decrease in light transmittance at 660 nm wavelength is about 30% or less after the soy sauce is heated at 100 ° C. for 120 minutes.

8. A method of producing a brewed soy sauce, the method comprising the steps of:
   preparing a raw material from a plant protein-source material and a low-starch carbohydrate-source material; wherein said low-starch carbohydrate-source material is wheat bran;
   producing koji by providing and culturing koji mold on the raw material prepared;
   adding salt water to the produced koji; and
   brewing the mixture of the koji and salt water by fermenting the mixture,
   wherein yeast belonging to *Candida* genus is added to the mixture at least 5 days after adding the salt water to the koji and the fermentation is continued to mature the brewing.

9. The method of claim 8, wherein a starch content of the low-starch carbohydrate-source material is 30% (w/v) or less.

10. The method of claim 8, wherein the yeast belonging to *Candida* genus is added to the mixture within 30 days after adding the salt water to the koji.

11. The method of claim 8, wherein the fermentation is continued for at least 30 days after the yeast belonging to *Candida* genus is added to the mixture.

12. The method of claim 8, wherein an amount of the yeast belonging to *Candida* genus is comprised between $10^5$ -$10^7$ cfu, which is added to the mixture per 1 gram of the mixture.

* * * * *